US012626632B2

(12) United States Patent
Wu et al.

(10) Patent No.: US 12,626,632 B2
(45) Date of Patent: May 12, 2026

(54) TILED DISPLAY SCREEN, DISPLAY METHOD THEREOF, DISPLAY SYSTEM, COMPUTER DEVICE AND MEDIUM

(71) Applicant: BOE TECHNOLOGY GROUP CO., LTD., Beijing (CN)

(72) Inventors: Yanhong Wu, Beijing (CN); Feng Hou, Beijing (CN); Shuguo Zhang, Beijing (CN); Xian Wang, Beijing (CN); Congrui Wu, Beijing (CN); Ran Duan, Beijing (CN); Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 74 days.

(21) Appl. No.: 18/701,242

(22) PCT Filed: Dec. 26, 2022

(86) PCT No.: PCT/CN2022/142018
§ 371 (c)(1),
(2) Date: Apr. 14, 2024

(87) PCT Pub. No.: WO2024/138318
PCT Pub. Date: Jul. 4, 2024

(65) Prior Publication Data
US 2025/0259585 A1 Aug. 14, 2025

(51) Int. Cl.
*G09G 3/20* (2006.01)
*G09G 3/32* (2016.01)

(52) U.S. Cl.
CPC ............. *G09G 3/2074* (2013.01); *G09G 3/32* (2013.01); *G09G 2300/0804* (2013.01);
(Continued)

(58) Field of Classification Search
CPC .................. G09G 3/2074; G09G 3/32; G09G 2300/0804; G09G 2320/0242;
(Continued)

(56) References Cited

U.S. PATENT DOCUMENTS

2018/0350296 A1* 12/2018 Thompson ............ G06F 3/0673

FOREIGN PATENT DOCUMENTS

CN 105895056 A 8/2016
CN 108877678 A 11/2018
(Continued)

*Primary Examiner* — Kenneth B Lee, Jr.
(74) *Attorney, Agent, or Firm* — HOUTTEMAN LAW LLC

(57) ABSTRACT

A tiled display screen, a display method, a tiled display system, a computer device, a computer non-transitory readable storage medium are provided. The tiled display screen includes: a plurality of display modules each including a receiver, a processor, and at least one display panel. the processor is configured to acquire heat accumulation data of each display region in the display module; determining target gray-scale compensation data of each pixel according to the heat accumulation data, a heat influence coefficient among different display regions, first gray-scale data of the pixel corresponding to the data to be displayed, and a pre-generated gray-scale compensation table; and compensating a gray scale of the pixel according to the target gray-scale compensation data.

18 Claims, 6 Drawing Sheets

(52) U.S. Cl.
CPC ............... *G09G 2320/0233* (2013.01); *G09G 2320/0242* (2013.01); *G09G 2320/041* (2013.01); *G09G 2320/0666* (2013.01); *G09G 2330/023* (2013.01)

(58) Field of Classification Search
CPC ..... G09G 2320/041; G09G 2320/0666; G09G 2330/023
See application file for complete search history.

(56) References Cited

FOREIGN PATENT DOCUMENTS

| | | | |
|---|---|---|---|
| CN | 109003568 | A | 12/2018 |
| CN | 114120906 | A | 3/2022 |
| CN | 114283728 | A | 4/2022 |
| CN | 114898717 | A | 8/2022 |
| CN | 115019721 | A | 9/2022 |
| JP | 2015184442 | A | 10/2015 |

* cited by examiner

TILED DISPLAY SCREEN, DISPLAY METHOD THEREOF, DISPLAY SYSTEM, COMPUTER DEVICE AND MEDIUM

FIELD OF THE PRESENT DISCLOSURE

The present disclosure relates to the technical field of display, in particular, to a tiled display screen, a display method thereof, a tiled display system, a computer device and a computer non-transitory readable storage medium.

BACKGROUND OF THE PRESENT DISCLOSURE

When a Micro light-emitting diode (Micro-LED/Mini-LED) tiled screen based on the miniaturization and matrixing technology of light-emitting diodes (LEDs) lights to display an image with a certain gray scale for a long time, a regional temperature difference occurs. Since the luminous efficiency of the screen decreases with the increase in temperature, visual residual images occur when the display images of the screen are switched, therefore elimination of the visual residual images in the screen and the optimization of the display effect of the screen become problems to be solved urgently in the field of display screens at present.

SUMMARY OF THE PRESENT DISCLOSURE

In order to solve at least one of the problems to be solved in the art, the present disclosure provides a tiled display screen, a display method thereof, a tiled display system, a computer device and a computer non-transitory readable storage medium.

As a first aspect, the present disclosure provides a tiled display screen, including: a plurality of display modules, each of the plurality of display modules comprising: a receiver, a processor, and at least one display panel, each of the display panel comprising at least one display region, each of the display region comprising a plurality of pixels. The receiver is configured to receive regional image data, wherein the regional image data at least comprises data to be displayed in each of the display regions in the display module; the processor is configured to: acquire heat accumulation data for each of the display regions in the display module; determine target gray-scale compensation data for each pixel according to the heat accumulation data, a heat influence coefficient between different display regions, first gray-scale data for the pixel corresponding to the data to be displayed, and a pre-generated gray-scale compensation table; and compensate a gray scale of the pixel according to the target gray-scale compensation data; wherein the heat accumulation data represent an accumulated heat influence on the display region of at least one frame of historical image data for the display region.

In some embodiments, the processor includes: a heat acquisition module configured to acquire the heat accumulation data for each of the display regions in the display module; a compensation data determination module configured to determine the target gray-scale compensation data for each pixel according to the heat accumulation data, the heat influence coefficient between the different display regions, the first gray-scale data for the pixel corresponding to the data to be displayed, and the pre-generated gray-scale compensation table; and a compensation module configured to compensate the gray scale of the pixel according to the target gray-scale compensation data.

In some embodiments, for each of the display regions, the heat acquisition module is specifically configured to determine the heat accumulation data for the display region, according to the at least one frame of historical image data for the display region, a target influence coefficient of each of the at least one frame of historical image data on the data to be displayed, and a pre-determined fitting relation between a gray scale and a temperature rise coefficient.

In some embodiments, the heat acquisition module includes: a coefficient determination sub-module configured to: for each of the at least one frame of historical image data, determine a temperature rise coefficient of the display region corresponding to the historical image data, according to second gray-scale data for each pixel corresponding to the historical image data and the fitting relation between the gray scale and the temperature rise coefficient; and a weighting process sub-module configured to weighting the temperature rise coefficients of the display region, according to the target influence coefficient of each of the at least one frame of historical image data on the data to be displayed, so as to acquire the heat accumulation data for the display region.

In some embodiments, the coefficient determination sub-module includes: a first determination unit configured to average the second gray-scale data for all pixels in the display region corresponding to the historical image data to acquire averaged gray-scale data for the display region; and a second determination unit configured to determine the temperature rise coefficient of the display region corresponding to the historical image data according to the average gray-scale data and the fitting relation.

In some embodiments, the coefficient determination sub-module further includes: a third determination unit configured to: acquire a gray-scale ratio of sub-pixels in each pixel; and determine the second gray-scale data of the pixel according to the gray-scale ratio and pixel information of the sub-pixels of the pixel corresponding to the historical image data.

In some embodiments, the processor further includes: a first gray scale determination module configured to acquire a gray-scale ratio of sub-pixels of each pixel corresponding to the data to be displayed; and determine the first gray-scale data for the pixel according to the gray-scale ratio and the pixel information of the sub-pixels of the pixel corresponding to the data to be displayed.

In some embodiments, the tiled display screen further includes: a first pre-process module configured to respectively lighten up the tiled display screen according to colors of the sub-pixels to acquire temperature variation values of the tiled display screen corresponding to the colors; and take a ratio of the temperature variation values of the tiled display screen corresponding to the colors of the sub-pixels as the gray-scale ratio of the sub-pixels.

In some embodiments, the compensation data determination module includes: a first determination sub-module, a second determination sub-module, and a third determination sub-module. The first determination sub-module is configured to take anyone of the display regions as a target display region; and determine a gray-scale compensation coefficient of the target display region, according to the heat influence coefficients and the heat accumulation data for the display regions in a preset region centered on the display panel to which the target display region belongs; the second determination sub-module is configured to determine initial gray-scale compensation data of each pixel, according to the first gray-scale data for each pixel corresponding to the data to be displayed in the target display region and the gray-scale compensation table; and the third determination sub-module is configured to determine the target gray-scale compensation data for each pixel, according to the gray-scale compensation coefficient and the initial gray-scale compensation data.

In some embodiments, the first determination sub-module is specifically configured to: weighting the heat accumulation data for the display regions in the preset region, according to the heat influence coefficients of the display regions in the preset region, so as to acquire the gray-scale compensation coefficient of the target display region.

In some embodiments, the regional image data further includes data to be displayed for at least a part of the display regions in an adjacent display module; and the data to be displayed in each display region in the preset region centered on anyone of the display panels of the display module is included in the regional image data.

In some embodiments, the display module further includes a second pre-process module configured to control the tiled display screen to display each of the target gray scales in a preset range of gray scale. Controlling the tiled display screen to display each of the target gray scales includes: controlling a first region of the tiled display screen to display an image with a maximum gray scale and controlling a second region of the tiled display screen to display an image with a minimum gray scale; after a temperature of the tiled display screen is stable, controlling the first region to display with the target gray scale and controlling the second region to display with correction gray scale, such that a brightness of the first region is the same as a brightness of the second region. A difference value between the target gray scale and the correction gray scale is served as initial gray-scale compensation data; the gray-scale compensation table comprises each of the target gray scales in the preset range of gray scale and the initial gray-scale compensation data corresponding to the target gray scale.

In some embodiments, the tiled display screen further includes a third pre-process module configured to: select one of the display panels in the tiled display screen as a reference display panel; acquire an initial temperature of the reference display panel before the reference display panel is lightened up; lighten up the reference display panel with a test gray scale to acquire a current temperature of each of Q×Q display regions centered on the reference display panel; take a difference value between the current temperature and the initial temperature of the display region as a temperature variation value of the display region; and normalize a ratio of the temperature variation value for each of the Q×Q display regions and a maximum temperature variation value to acquire a filtering parameter matrix, with the filtering parameter matrix comprising the heat influence coefficients of all display regions in the preset region.

In some embodiments, the display module further includes a fourth pre-process module configured to: control the tiled display screen to display each of the target gray scales in a preset range of gray scale to acquire the temperature rise value of the tiled display screen corresponding to each of the target gray scales; acquire the temperature rise coefficient of the tiled display screen corresponding to each of the target gray scales, wherein the temperature rise coefficient is a ratio of the temperature rise value to a maximum temperature rise value; and determine the fitting relation between the gray scale and the temperature rise coefficient, according to the temperature rise coefficient of the tiled display screen corresponding to each of the target gray scales.

In some embodiments, the tiled display screen further includes a fifth pre-process module and a sixth pre-process module. The fifth pre-process module is configured to acquire a time interval immediately after which the visible residual image begins to appear; and determine a number of images displayed during the time interval according to a frame rate of the tiled display screen. The sixth pre-process module is configured to: acquire multiple frames of test image data and a preset initial influence coefficient of each of the multiple frames of test image data, according to the number of the images displayed during the time interval; wherein a sum of the initial influence coefficients is 1; the initial influence coefficient of a previous frame of test image data is greater than or equal to the initial influence coefficient of a next frame of test image data; acquire a first increased temperature of the tiled display screen after the tiled display screen plays the multiple frames of test image data; weight the pixel information of each pixel corresponding to each frame of test image data according to each of the initial influence coefficients to acquire third gray-scale data; lighten the tiled display screen with the third gray-scale data for a lightening duration which is the same as a duration for playing the multiple frames of test image data, and acquire a second increased temperature of the tiled display screen after the lightening duration elapses; and in response to that a difference between the first increased temperature and the second increased temperature does not meet a preset condition, update the initial contribution coefficient until the difference between the first increased temperature and the second increased temperature meets a second preset condition; and take the updated initial influence coefficient as the target influence coefficient.

In some embodiments, the fifth pre-process module is specifically configured to: lighten a first region of the tiled display screen with a first gray scale and lighten a second region of the tiled display screen with a second gray scale; and lighten the first region and the second region with the second gray scale simultaneously every a target duration, so as to acquire the time interval immediately after which the visible residual image begins to appear.

In some embodiments, the sixth pre-process module is specifically configured to update the target influence coefficient by: for each of the initial contribution coefficients, respectively adjusting the initial contribution coefficients corresponding to the previous frame of test image data and the next frame of test image data, such that the initial influence coefficient of the adjusted previous frame of test image data is larger than the initial influence coefficient of the previous frame of test image data before adjustment, and the initial influence coefficient of the adjusted next frame of test image data is smaller than the initial influence coefficient of the next frame of test image data before adjustment.

In some embodiments, the display module further includes: a storage module; an update module configured to store the regional image data into the storage module to update the historical image data.

As a second aspect, the present disclosure provides a tiled display system, including the tiled display screen described above; and a transmitter configured to transmit the regional image data to each of the display modules according to the image data of the image to be displayed.

As a third aspect, the present disclosure provides a display method of a tiled display screen including a plurality of display modules, wherein the display method includes: receiving, by each of the plurality of display modules, regional image data, wherein the regional image data at least comprises data to be displayed in each of display regions in the display module; acquiring, by the display module, heat accumulation data of each of the display regions; determining target gray-scale compensation data of each pixel according to the heat accumulation data, a heat influence coefficient between different display regions, first gray-scale data of the pixel corresponding to the data to be displayed, and a pre-generated gray-scale compensation table; and compensating a gray scale of the pixel according to the target gray-scale compensation data; wherein the heat accumulation data represent an accumulated heat influence on the display region of at least one frame of historical image data of the display region.

As a fourth aspect, the present disclosure provides a computer device, including: a processor, a memory and a bus, the processor and the memory communicating with each other via the bus, the memory storing machine readable instructions which are configured to, when being run by the processor, cause the processor to perform the display method described above.

As a fifth aspect, the present disclosure provides a computer-non-transitory readable storage medium with a computer program stored thereon which is configured to, when being run by the processor, cause the processor to perform the display method described above.

BRIEF DESCRIPTION OF THE DRAWINGS

The accompanying drawings are intended to provide a further understanding of the present disclosure and form a part of the specification. The drawings are used to illustrate the present disclosure together with the specific embodiments below, but do not constitute a limitation on the present disclosure. In the drawings.

DETAILED DESCRIPTION OF THE EXEMPLARY EMBODIMENTS

Figure 1:
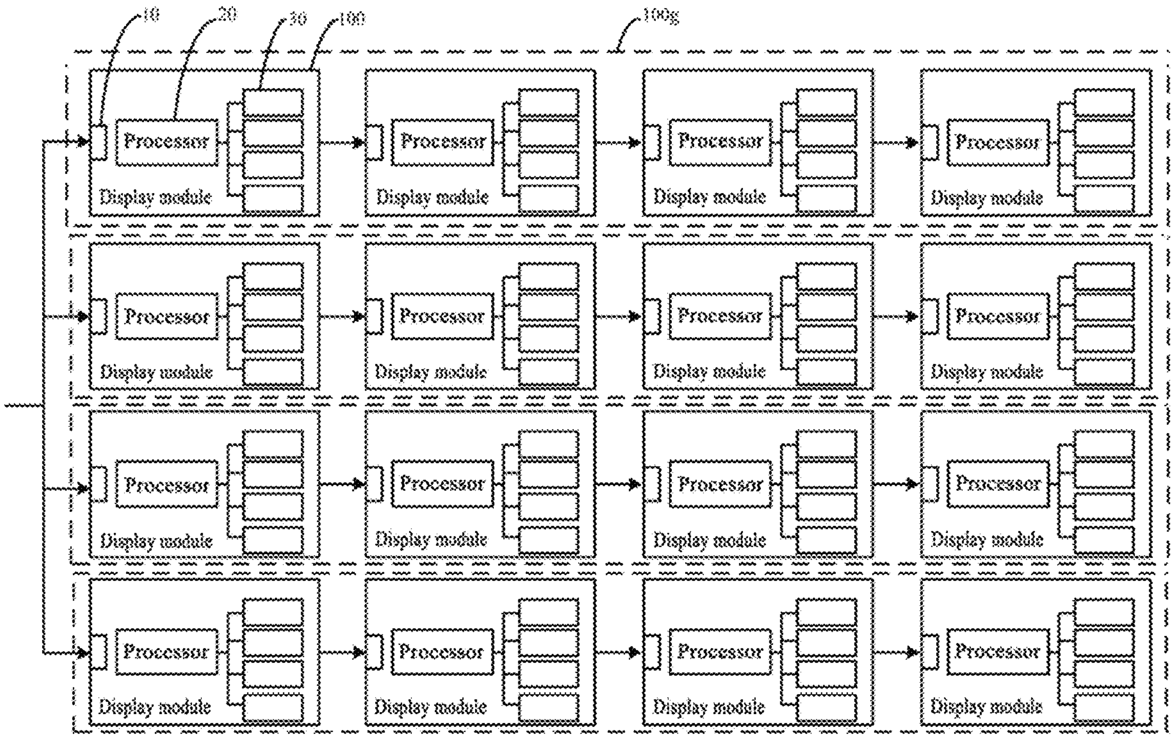
FIG. 1 is a schematic diagram showing a tiled display screen in some embodiments of the present disclosure.

The specific implementations of the present disclosure will be illustrated in combination with the accompanying drawings. It should be understood that the specific embodiments described herein are only intended to illustrate and explain the present disclosure and are not intended to limit the present disclosure.

In order to make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. All other embodiments, which can be derived by a person skilled in the art from the described embodiments of the present disclosure without inventive step, fall within the scope of protection of the present disclosure.

Unless otherwise defined, technical or scientific terms used in the embodiments of the present disclosure should have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Similarly, the word "include" or "comprise", or the like, means that the element or item preceding the word comprises the element or item listed after the word and its equivalent, but does not exclude other elements or items. The terms "connect" or "couple" and the like are not restricted to physical or mechanical connections, but may include electrical connections, whether direct or indirect. "Upper", "lower", "left", "right", and the like are used only to indicate relative positional relationships, and when the absolute position of the object being described is changed, the relative positional relationships may also be changed accordingly.

Micro light emitting diodes (Mini-LEDs/Micro-LEDs) have the advantages such as high brightness, high contrast, fast response, and low power consumption, therefore display technologies based on MLEDs are increasingly widely applied in the display field. Specifically, the thinning, miniaturization, and matrixing of an MLED display panel are realized by integrating a high-density array of MLEDs on a base substrate.

Most MLED products are driven by Active Matrix in which each pixel may emit light continuously and independently. Compared with the traditional display panel such as a liquid crystal display panel, the MLED display panel has smaller chip size and smaller pixel pitch, so that the MLED display panel has higher heat density, and thus the heat dissipation requirement of the MLED display panel is higher. Based on the above technical requirements, the display driving of the MLED display panel can be realized by using a COG (Chip on Glass) technology, that is, the MLED chip is directly attached to a glass substrate, and the MLED chip is driven by a thin film transistor to emit light.

In COG technology based on glass substrate technology, ultra-fine thin film transistor driving structures may be acquired on a large area by adopting semiconductor, photoetching and advanced copper technologies. However, since the MLED display panel using COG technology integrates high-density MLEDs and thin film transistors therein, and the pixel pitch is less than 100 μm, more circuit structures such as temperature measurement circuits and the like cannot be formed, and therefore it is difficult to detect the temperature of the display panel in real time to acquire the temperature feedback of the display panel.

In some display products such as tiled displays, when a certain image picture is displayed on the tiled display based on the MLED for a long time, the MLED is turned on for a long time, so that the temperature of the screen increases, and the luminous efficiency of the MLED decreases with the increase in temperature. The MLEDs in different colors produce different luminance losses with increasing temperature, with the red MLED losing the most luminance with increasing temperature. Since the temperature feedback of the MLED display panel is difficult to acquire, and the luminance loss caused by the temperature rise of the screen cannot be effectively compensated, therefore the image content of the previous image picture is remained on the display panel when the image picture displayed on the screen is switched to the next image picture, that is, the residual image appears, thereby affecting the display effect of the display panel.

FIG. 1 is a schematic diagram showing a tiled display screen in some embodiments of the present disclosure. As shown in FIG. 1, the tiled display screen 1 includes a plurality of display modules 100, each of the plurality of display modules 100 includes: a receiver 10, a processor 20, and at least one display panel 30. The display panels 30 of the plurality of display modules 100 are spliced together. For example, the display panels 30 of the plurality of display modules 100 may be arranged in an array, alternatively the display panels 30 of the plurality of display modules 100 may also be spliced together in other manners. Each display module 100 may include one or more display panels 30, each display panel 30 includes at least one display region, and each display region includes a plurality of pixels. Each pixel may include a plurality of sub-pixels, e.g., a red sub-pixel, a green sub-pixel, and a blue sub-pixel.

The receiver 10 is configured to receive regional image data, where the regional image data at least includes data to be displayed in each display region of the display module 100 where the receiver 10 is located.

The regional image data may be transmitted to the display module 100 by a transmitter in the tiled display system. The transmitter may determine the regional image data of each display panel 30 according to the image to be displayed on the tiled display screen; alternatively after the image to be displayed is stretched, enhanced, etc., the transmitter may determine the regional image data transmitted to each display module 100 according to the processed image.

In one example, the plurality of display modules 100 are connected in parallel with each other, each display module 100 is individually connected to the transmitter, and the transmitter transmits respective regional image data to the plurality of display modules 100, respectively. In another example, the plurality of display modules 100 are connected in series and connected to the transmitter. The transmitter generates total data information according to the regional image data for all the display modules 100; and transmits the total data information to the first display module 100. For each of the remaining display modules 100 except the last display module 100, after a current display module 100 receives the total data information, the current display module 100 extracts the regional image data from the total data information according to a preset communication mode, and transmits the total data information to the next display module 100. In another example, as shown in FIG. 1, the plurality of display modules 100 may include a plurality of display groups 100*g* connected in parallel, where each display group 100*g* includes multiple display modules 100 connected in series; the transmitter generates data information corresponding to each display group 100*g* according to the regional image data for the display module 100 in the display group 100*g*; and transmits the data information to the corresponding display module 100*g*. For each of the remaining display modules 100*g* except the last display module 100, after a current display module 100*g* receives the data information, the current display module 100*g* extracts the regional image data for the current display module 100 from the data information according to a preset communication mode, and transmits the data information to the next display module 100.

The processor 20 is configured to acquire heat accumulation data for each display region in the display panel 30; determine target gray-scale compensation data of each pixel according to the heat accumulation data, a heat influence coefficient between different display regions, first gray-scale data of each pixel corresponding to the data to be displayed, and a pre-generated gray-scale compensation table; and compensating a gray scale of the pixel according to the target gray-scale compensation data.

It can be understood that when each frame of image is displayed in the display region, the displayed gray scale can cause the display region to generate a certain amount of heat, which causes the temperature of the display region to change. The higher the gray scale is, the higher the temperature of the display region is. In addition, the heat generated by the display region may also be affected by the historical image data. For example, when the display region displays the $x^{th}$ frame of image, the heat generated during the displaying process of several frames of historical image before the $x^{th}$ frame of image may affect the current temperature of the display region, thereby affecting the actual display effect of the display region. The heat accumulation data represent the accumulated heat influence of the historical image data displayed in the display region on the display region for the recent period of time, namely, the accumulated result of the influence of the heat generated by the historical image data on the current display region.

In addition, since heat may diffuse over different display regions, the temperature of each display region may also be affected by the temperatures of other display regions, so that the actual display effects of different display regions may also affect each other. The heat influence coefficient represents the heat influence degree between the display regions, namely, the temperature influence degree or the gray scale influence degree.

The first gray-scale data of a pixel may be determined based on the pixel information of the sub-pixels of the pixel. For example, the first gray-scale data of a pixel is acquired by weighting and summing the pixel information of the sub-pixels of the pixel. The specific process will be described in the following description of the processing process of a first gray-scale determination module 21, and will not be described herein.

The gray-scale compensation table may be pre-generated and may be directly acquired. The process of generating the gray-scale compensation table may be referred to the processing process of a second pre-process module 42 described below, and will not be described in detail here.

The gray-scale compensation table includes pieces of gray-scale data and initial compensation data corresponding to each piece of gray-scale data. Specifically, the processor 20 may determine initial compensation data of a pixel according to the first gray-scale data and the gray-scale compensation table; determine a gray-scale compensation coefficient according to the first gray-scale data, the heat accumulation data and the heat influence coefficient; and determine target gray-scale compensation data according to the gray-scale compensation coefficient and the initial compensation data.

During the process of compensating a gray scale of a pixel according to the target gray-scale compensation data, the compensated gray-scale data may be determined according to the target gray-scale compensation data and the pixel information of the sub-pixels in the pixel, and the pixel may be driven to display according to the compensated gray-scale data.

In the embodiment of the present disclosure, after the processor 20 in the display module 100 receives the regional image data, the processor 20 compensates a gray scale of the pixel in each display region in the display panel 30; during the gray-scale compensation process, the heat influence of historical image data on the display region and the heat influence between the display regions (i.e., heat accumulation data and heat influence coefficients) are fully considered. In combination with the heat accumulation data and the heat influence coefficient, more accurate target gray-scale compensation data may be determined. The target gray-scale compensation data is used for gray-scale compensation of the pixel, visual residual images in the display region can be eliminated, and uniformity and consistency of a display image can be improved. Moreover, the processors 20 in different display modules 100 are independent of each other, and each processor 20 may calculate the target gray-scale compensation data for the pixel in the display module 100 where the processor is located, so that the calculation power can be shared, and the overall driving speed of the tiled display screen can be improved.

Figure 2:
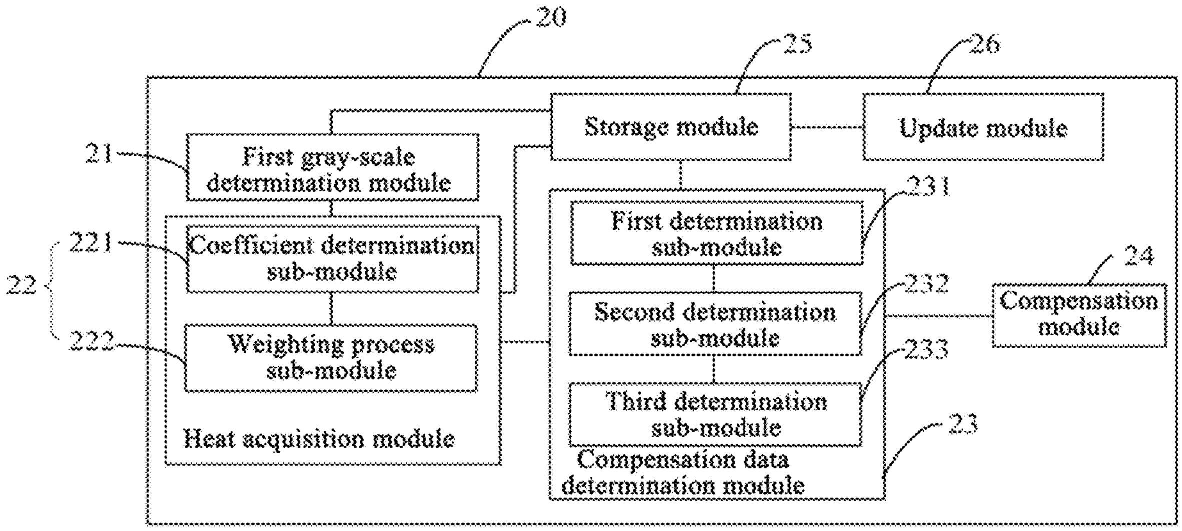
FIG. 2 is a schematic diagram showing a processor in some embodiments of the present disclosure.

FIG. 2 is a schematic diagram showing a processor in some embodiments of the present disclosure. As shown in FIG. 2, the processor 20 includes: a first gray scale determination module 21, a heat acquisition module 22, a compensation data driving module, and a compensation module 24.

In some embodiments, the first gray scale determination module 21 is configured to determine first gray-scale data of each pixel corresponding to the data to be displayed. Specifically, the first gray scale determination module 21 may first acquire a gray-scale ratio of sub-pixels of each pixel corresponding to the data to be displayed; and determine first gray-scale data of each pixel according to the gray-scale ratio and the pixel information of sub-pixels of each pixel corresponding to the data to be displayed.

The gray-scale ratio of the sub-pixels may be predetermined, and the process of determining the gray-scale ratio is referred to as the processing process of the first pre-process module 41, which will not be described herein.

It should be noted that each pixel in the image includes a plurality of sub-pixels, for example, the plurality of sub-pixels includes a red sub-pixel, a green sub-pixel, and a blue sub-pixel. The red sub-pixel, the green sub-pixel and the blue sub-pixel respectively correspond to three channels of the pixel, namely, the red sub-pixel corresponds to the red channel R, the green sub-pixel corresponds to the green channel, and the blue sub-pixel corresponds to the blue channel. The pixel information of the sub-pixel may be a channel value of the channel corresponding to the sub-pixel. That is, the pixel information of the sub-pixels may be a red channel value corresponding to a red channel, a green channel value corresponding to a green channel, and a blue channel value corresponding to a blue channel, respectively.

In some examples, the gray-scale ratio of red, green, and blue sub-pixels is $a_R$:$b_R$:$c_R$. Assuming that for a certain pixel corresponds to the data to be displayed, the pixel information of the red sub-pixel of the pixel is denoted as R, the pixel information of the green sub-pixel of the pixel is denoted as G, and the pixel information of the green sub-pixel of the pixel is denoted as B, then the first gray-scale data $G_{ratio1}$ of the pixel is determined based on the following Formula (1):

$$G_{ratio1} = a_R * R + b_R * G + c_R * B \quad (1)$$

In some embodiments, the heat acquisition module 22 is configured to acquire heat accumulation data for each display region in the display panel 30.

For example, for each of the display regions, the heat acquisition module 22 is specifically configured to determine heat accumulation data for the display region according to at least one frame of historical image data for the display region, a target influence coefficient of each frame of the at least one frame of historical image data on the data to be displayed, and a pre-determined fitting relation between the gray scale and the temperature rise coefficient.

The target influence coefficient represents the gray scale influence degree of the historical image data of the display region on the data to be displayed. The target influence coefficient of each frame of historical image data may be pre-determined and directly acquired. The process of setting the target influence coefficient for each frame of historical image data may be referred to the processing of the fifth and sixth pre-process modules described below, and will not be described in detail here. It should be noted that a sum of the target influence coefficients is 1, that is, $$\sum_{i=1}^{N} a_i = 1,$$

where $\alpha_i$ represents the target influence coefficient corresponding to the $i^{th}$ frame of historical image data, and N represents the N frames of historical image data. The temperature rise coefficient represents a degree of change in temperature. The fitting relationship between the gray scale and the temperature rise coefficient may be determined in advance by the fourth pre-process module 44. The process of determining the fitting relationship will be described below, and will not be described in detail herein.

In some embodiments, the heat acquisition module 22 may specifically include a coefficient determination sub-module 221 and a weighting process sub-module 222.

The coefficient determination sub-module 221 is configured to, for each frame of the at least one frame of historical image data, determine a temperature rise coefficient of the display region corresponding to the historical image data according to the second grayscale data of each pixel in the frame of historical image data and the fitting relationship between the gray scale and the temperature rise coefficient.

Figure 3:
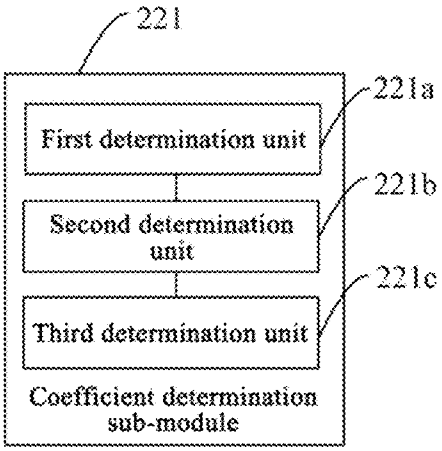
FIG. 3 is a schematic diagram showing a coefficient determination sub-module in some embodiments of the present disclosure.

FIG. 3 is a schematic diagram showing a coefficient determination sub-module in some embodiments of the present disclosure. In some embodiments, as shown in FIG. 3, the coefficient determination sub-module 221 may include a first determination unit 221*a*, a second determination unit 221*b*, and a third determination unit 221*c*. The third determination unit 221*c* is configured to acquire a gray-scale ratio of sub-pixels of a pixel; and determine second gray-scale data of each pixel according to the gray-scale ratio and the pixel information of the sub-pixels of the pixel corresponding to the historical image data.

Taking a certain pixel point in the historical image data as an example, assuming that the pixel information of the red, green, and blue sub-pixels of the pixel is R', G', and B', respectively, and then the second gray-scale data $G_{ratio2}$ of the pixel may be determined by the following Formula (2).

$$G_{ratio2} = a_R * R' + b_R * G' + c_R * B' \quad (2)$$

The first determination unit 221*a* is configured to average the second gray-scale data of all the pixels in the display region corresponding to each piece of historical image data, to acquire average gray-scale data of the display region. For example, the first determination unit 221*a* may accumulate the second gray-scale data of the pixels in the same row in the display region in the row dimension according to the associated clock, accumulate the second gray-scale data of the pixels in multiple rows, and divide the accumulated second gray-scale data by the total number of the pixels in the display region to acquire the average gray-scale data of the display region.

The second determination unit 221*b* is configured to determine the temperature rise coefficient of the display region corresponding to each historical image data according to the average grayscale data and the fitting relationship between the gray scale and the temperature rise coefficient.

The fitting relationship between the gray scale and the temperature rise coefficient may be expressed as follows: $Y=\alpha*Gray^{\beta}$, wherein Y represents the temperature rise coefficient, Gray represents a gray scale, and $\alpha$ and $\beta$ are preset parameters. After the first determination unit 221*a* determines the average gray-scale data of the display region corresponding to each historical image data, the average gray-scale data of the display region corresponding to each historical image data is substituted into the fitting relationship above, so that the temperature rise coefficient of the display region corresponding to each historical image data may be acquired.

In some embodiments, the weighting process sub-module 222 is configured to weight the temperature rise coefficients corresponding to the display region according to a target influence coefficient of each frame of the at least one of historical image data on the data to be displayed, so as to acquire heat accumulation data of the display region.

Taking the display region with a coordinate (x, y) in display module 100 as an example, the temperature rise coefficient corresponding to the $i^{th}$ frame of historical image data in the display region is denoted as $G_i^{(x,y)}$, and the heat accumulation data $$G_{mean}^{(x,y)}$$

for the display region may be determined by the following Formula (3).

$$G_{mean}^{(x,y)} = \sum_{i=1}^{N} G_i^{(x,y)} * a_i \quad (3)$$

$\alpha_i$ is the target influence coefficient of the $i^{th}$ frame of historical image data on the data to be displayed; and $\alpha_i$ is related to i, but not to a position of the display region, that is to say, when i is constant, $\alpha_i$ is the same for different display regions.

In some embodiments, the compensation data determination module 23 is configured to, for each of the display regions, determine target gray-scale compensation data for a pixel according to the heat accumulation data for the display region, the heat influence coefficient between different display panels, the first gray-scale data of each pixel corresponding to the data to be displayed, and a pre-generated gray-scale compensation table.

In some embodiments, the compensation data determination module 23 includes a first determination sub-module 231, a second determination sub-module 232, and a third determination sub-module 233.

For each of the display regions, the first determination sub-module 231 is configured to take a display region as a target display region, and determine a gray-scale compensation coefficient of the target display region according to the heat accumulation data and the heat influence coefficient of each display region within a preset region centered on the display panel to which the target display region belongs.

Specifically, the first determination sub-module 231 is configured to weight the heat accumulation data of the display regions in the preset region according to the heat influence coefficients of the display regions in the preset region, so as to acquire the gray-scale compensation coefficient of the target display region.

Figure 4:
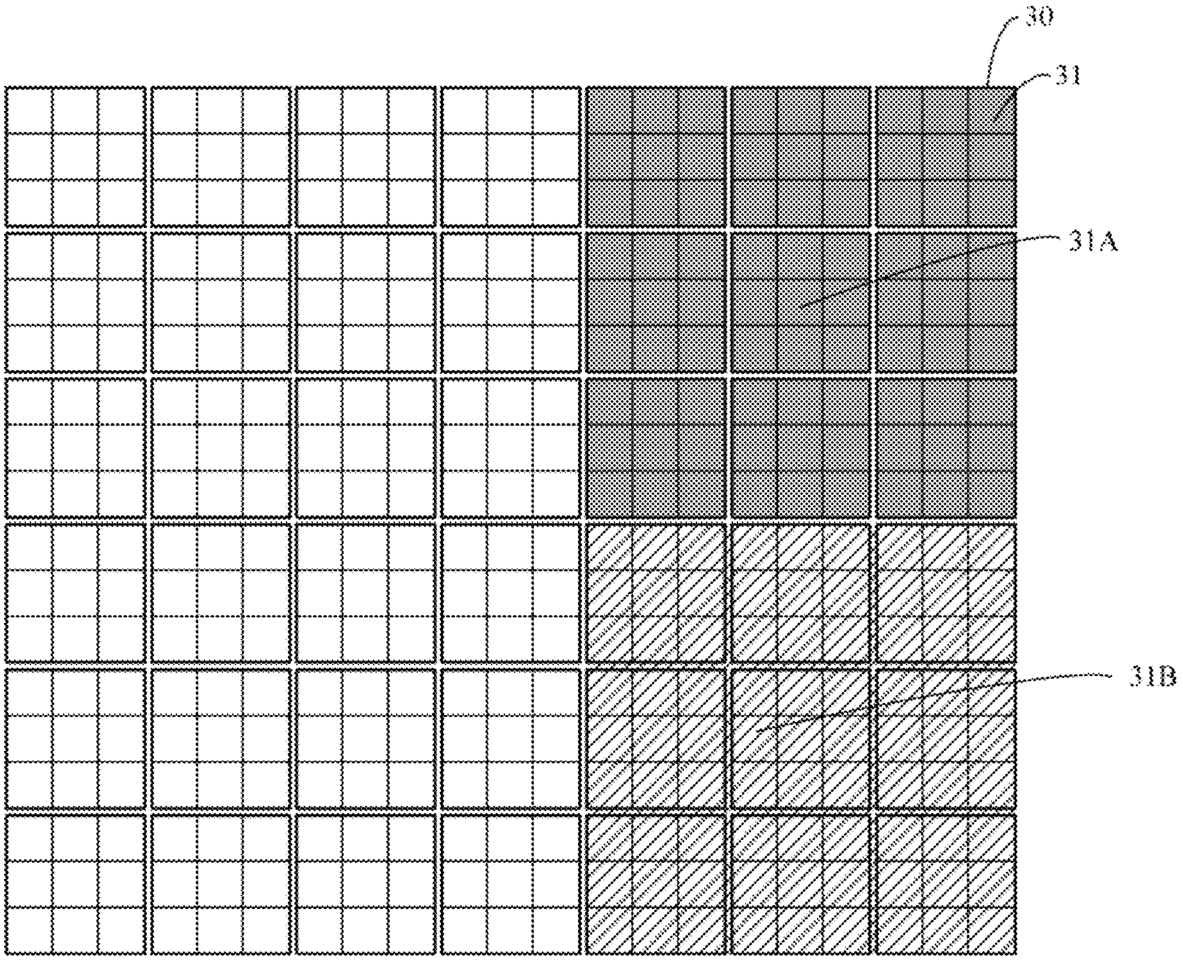
FIGS. 4 to 6 are plan views of tiled display screens in some embodiments of the present disclosure.
Figure 5:
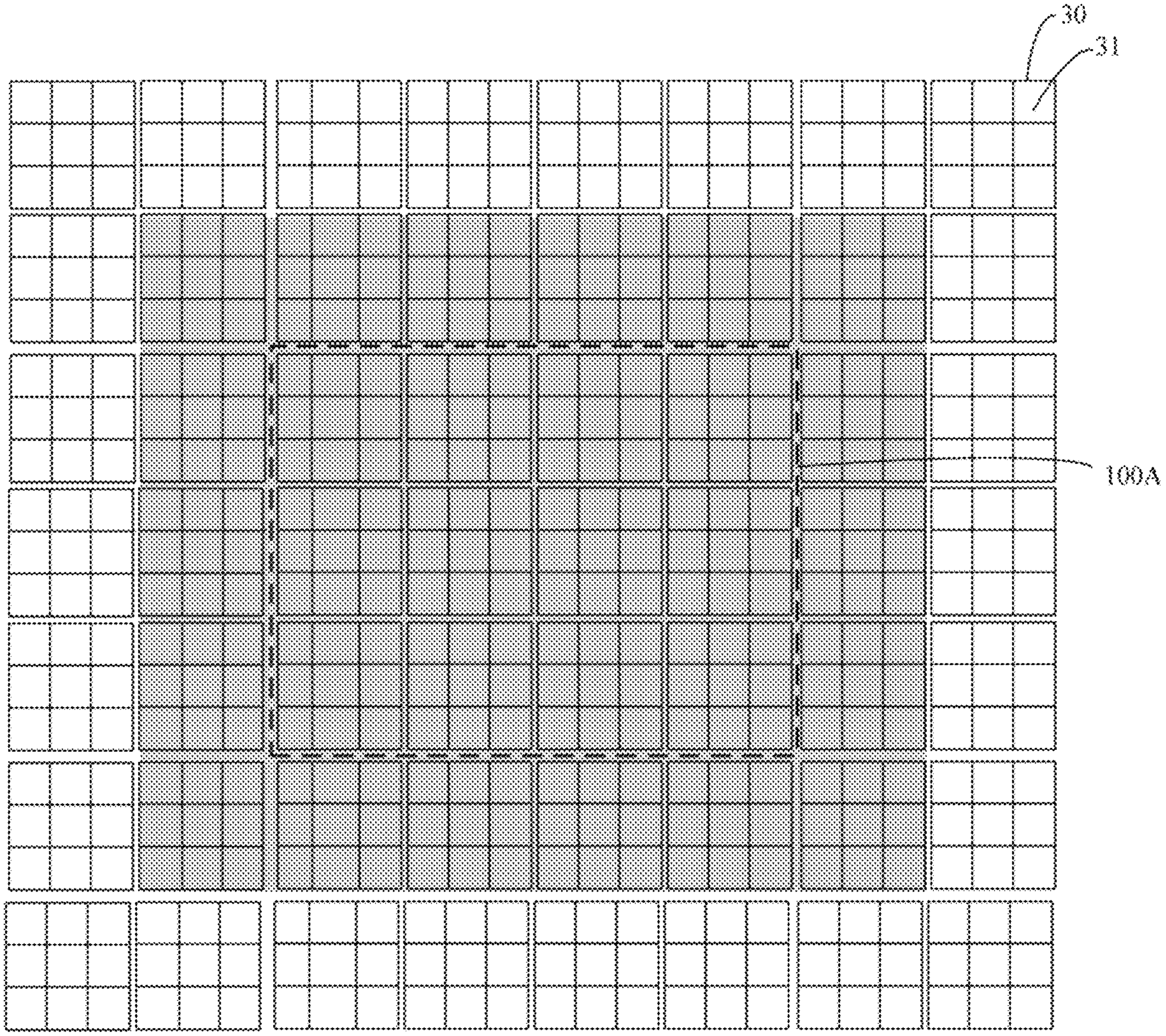
Figure 6:
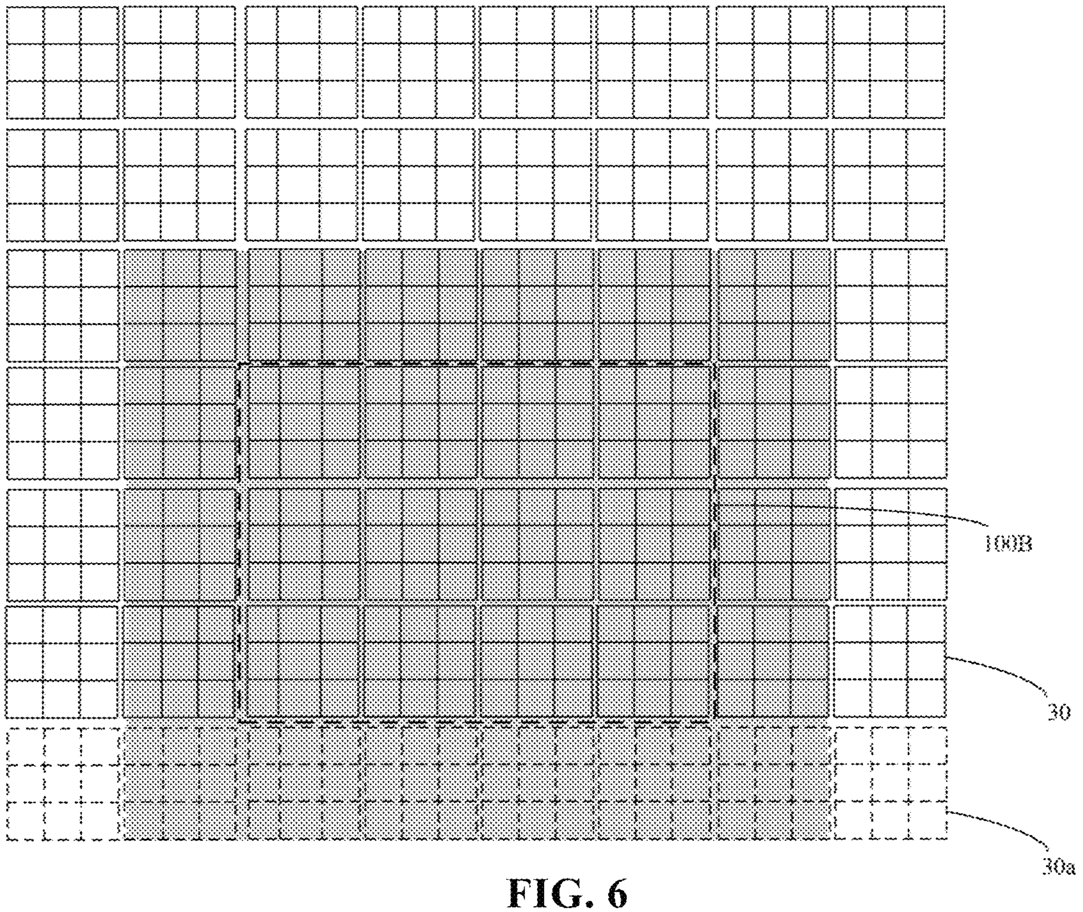

FIGS. 4 to 6 are plan views of a tiled display screen in some embodiments of the present disclosure. As shown in FIGS. 4 to 6, a plurality of display panels 30 of the tiled display screen are arranged in rows and columns. Each of the display panels 30 includes M×M display regions, and the preset region includes K×K display panels 30, that is, $K^2 \times M^2$ display regions, M and K are all integers greater than 0, and $K^2 \times M^2$ is an integer greater than 1. Taking K=3 and M=3 as an example, for the target display region 31A in FIG. 4, the preset region centered on the display panel 30 to which the target display region 31A belongs includes the display regions filled with gray color in FIG. 4; for the target display region 31B in FIG. 4, the preset region centered on the display panel 30 to which the target display region 31B belongs includes the display regions filled with diagonal lines in FIG. 4.

The heat influence coefficient of the $j^{th}$ display region of the $K^2 \times M^2$ display regions is denoted as $P_j$, and the heat accumulation data for the $j^{th}$ display region is denoted as $G_{mean}$ (j), the gray-scale compensation coefficient $W_{area}$ for each target display region is determined according to the following Formula (4).

$$W_{area} = \sum_{j=1}^{K^2 * M^2} G_{mean}(j) * P_j \quad (4)$$

For a target display region close to the center of the display module 100, the preset region corresponding to the target display region do not exceed the display module 100; and for a target display region close to the edge of the display module 100, the preset region corresponding to the target display region exceed the boundary of the display module 100. In order to ensure that the processor 20 can calculate the gray-scale compensation coefficient of each display region in the display module 100, in the embodiment of the present disclosure, the regional image data transmitted to the display module 100 by the transmitter includes the data to be displayed in each display region in the display module 100, and also includes the data to be displayed in at least part of the display regions in an adjacent display module 100. In addition, in a preset region with any display region in the display module 100 as the center, the data to be displayed in each display region is included in the regional image data.

As shown in FIG. 5 and FIG. 6, for example, each display module 100 includes 3×4 display panels 30. Assuming that each display panel 30 includes 3×3 display regions and the preset region includes 3×3 display panels 30. For the display module 100A, the regional image data received by the corresponding processor 20 includes not only the data to be displayed in each display region of the display module 100A, but also the data to be displayed in each display region filled with gray in FIG. 5. As shown in FIG. 6, when the display module 100 is close to the edge of the tiled display screen, the regional image data received by the processor 20 corresponding to the display module 100 further includes data to be displayed in each display region of the virtual display panel 30*a*. For example, for the display module 100B, the regional image data received by the corresponding processor 20 includes not only the data to be displayed in each display region of the display module 100B, but also the data to be displayed in each display region filled with gray in FIG. 6, where the display panel identified by the dashed line is the virtual display panel 30*a*, and the data to be displayed in each display region of the virtual display panel 30*a* may be regarded as zero.

In some embodiments, the second determination sub-module 232 is configured to determine the initial gray-scale compensation data of each pixel according to the first gray-scale data of each pixel in the display region corresponding to the data to be displayed and the gray-scale compensation table. The gray-scale compensation table records the gray scales in a preset range of gray scale (e.g., from 0 to 255) and initial gray-scale compensation data corresponding to the gray scales. According to the first gray-scale data of the pixel, the initial gray-scale compensation data corresponding to the first gray-scale data may be searched from the gray-scale compensation table.

For each pixel in the display region, the third determination sub-module 233 is configured to determine target gray-scale compensation data of the pixel according to the gray-scale compensation coefficient and the initial gray-scale compensation data. Specifically, the third determination sub-module 233 determines the target gray-scale compensation data $C_W$ of the pixel according to the following Formula (5):

$$C_W = C_{max} \times (1 - W_{area}) \quad (5)$$

Wherein $C_{max}$ is the initial gray-scale compensation data of the pixel, and $W_{area}$ is the gray-scale compensation coefficient of the display region where the pixel is located.

In some embodiments, the compensation module 24 is configured to compensate the gray scale of each pixel according to the target gray-scale compensation data of the pixel. In some examples, the attenuation amount of the gray scale of the red sub-pixel is greatest, since red sub-pixel is most susceptible to temperature changes due to the inherent characteristic of the red sub-pixel. In order to improve the data processing efficiency, the gray scale of the red sub-pixel is compensated during the gray-scale compensation according to the following Formula (6) specifically:

$$P'_R = P_R - C_W \quad (6)$$

$P'_R$ is the compensated pixel information of the red sub-pixel of the pixel, $P_R$ is the original pixel information of the red sub-pixel. For the green and blue sub-pixels of the pixel, their pixel information remains unchanged.

Figure 7:
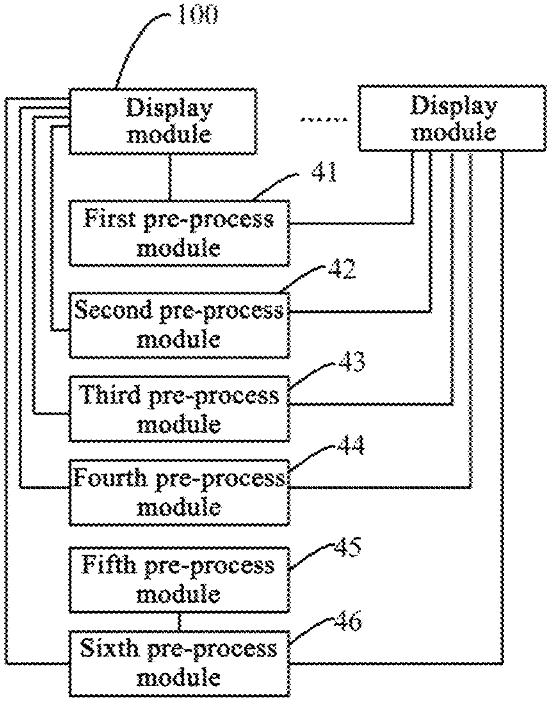
FIG. 7 is a schematic diagram showing a tiled display screen in other embodiments of the present disclosure.

FIG. 7 is a schematic diagram showing a tiled display screen in other embodiments of the present disclosure. As shown in FIG. 7, in addition to the plurality of display modules 100, the tiled display screen further includes a first pre-process module 41. The first pre-process module 41 is configured to respectively lighten up the tiled display screen according to the colors of the sub-pixels to acquire the temperature variation values of the tiled display screen displaying in the colors of the sub-pixels; and taking the ratio of the temperature variation value of the tiled display screen displaying in the colors of the sub-pixels as the gray-scale ratio of the sub-pixels.

For example, the tiled display screen is controlled to display red, and after the temperature of the tiled display screen is stable, the temperature rise value ΔTr of the screen is measured; the tiled display screen is controlled to display green, and after the temperature of the tiled display screen is stable, the temperature rise value ΔTg of the screen is measured; and the tiled display screen is controlled to display blue, and after the temperature of the tiled display screen is stable, the temperature rise value ΔTb of the screen is measured. The gray-scale ratio of the sub-pixels is ΔTr:ΔTg:ΔTb. When the temperature of the screen is measured, the temperatures at a plurality of positions of the screen may be measured, and the average value of the temperatures at the plurality of positions is taken as the overall temperature of the screen.

As shown in FIG. 7, the tiled display screen may further include: a second pre-process module 42. The second pre-process module 42 is configured to control the tiled display screen to display each of the target gray scales in a preset range of gray scale. For each of the target gray scales, the process of the second pre-process module 42 controlling the tiled display screen to display each of the target gray scales includes the following steps S101 to S102.

At step S101, controlling a first region of the tiled display screen to display an image with a maximum gray scale, and controlling a second region of the tiled display screen to display an image with a minimum gray scale.

In some examples, the first region and the second region are each half of the entire screen of the tiled display screen. Alternatively, areas of the first and second regions may also be different from each other. The image with the maximum gray scale refers to an image with the maximum gray scale or nearly the maximum gray scale of the gray scales which are displayed by the tiled display screen; the image with the minimum gray scale refers to an image with the minimum or nearly minimum gray scale of the gray scales which are displayed by the tiled display screen. For example, the tiled display screen may display the gray scales in a range from 0 to 255, the image with the maximum gray scale is an image with a gray scale in a range from 245 to 255, and the image with the minimum gray scale is an image with a gray scale in a range from 0 to 10. For example, the image with the maximum gray scale is an image with a gray scale of 255, and the image with the maximum gray scale is an image with a gray scale of 0.

At step S102, after the temperature of the tiled display screen is stable, controlling the first region to display a target gray scale and controlling the second region to display a correction gray scale so as to enable the brightness of the first region and the brightness of the second region to be consistent with each other; that is, the brightness of the first region is the same as that of the second region, every time the first region displays one of the target gray scales.

The difference value between the target gray scale and the correction gray scale is served as initial gray-scale compensation data corresponding to the target gray scale. The gray-scale compensation table includes each of the target gray scales in a preset range of the gray scale and the initial gray-scale compensation data corresponding to each of the target gray scales.

The preset range of the gray scale is a gray scale range that is capable of being displayed by the tiled display screen, and the preset range of the gray scale is from 0 to 255.

As shown in FIG. 7, the tiled display screen may further include a third pre-process module 43 configured to perform the following steps S201 to S203.

At step S201, selecting one of the display panels of the tiled display screen as a reference display panel, and lightening up the reference display panel according to the test gray scale.

The test gray scale may be the maximum gray scale or the nearly maximum gray scale that is displayed by the tiled display screen. For example, the test gray scale is 255.

At step S202, acquiring the temperature variation value, before and after the reference display panel is lightened up, of each of Q×Q display regions centered on the reference display panel.

The number of Q×Q is the number of the display regions in the preset region describe above. Before step S201, an initial temperature of each of Q×Q display regions centered on the reference display panel may be measured; in step S202, the current temperature of each of Q×Q display regions may be measured, and the temperature variation value of each of the display regions is the difference between the current temperature and the initial temperature.

When the temperature of the display region is measured, the temperatures at a plurality of positions in the display region may be measured, and an average value of the temperatures at the plurality of positions is served as the temperature of the display region.

At step S203, normalizing the ratio of the temperature variation value to the maximum temperature variation value of each of the Q×Q display regions to acquire a filtering parameter matrix. The filtering parameter matrix includes heat influence coefficients of the display regions in the preset region, and the sum of the heat influence coefficients in the filtering parameter matrix is 1.

As shown in FIG. 7, the tiled display screen may further include a fourth pre-process module 44 configured to perform the following steps S301 to S303.

At step S301, controlling the tiled display screen to display each of the target gray scales in a preset range of gray scale, and acquiring the temperature rise value of the tiled display screen when the tiled display screen display in each target gray scale.

At step S301, first, acquiring the temperature of the tiled display screen before being lit, controlling the tiled display screen to sequentially display the target gray scales in a preset range of gray scale, that is, sequentially displaying the gray scales in a range from 0 to 255; and when each of the target gray scales is displayed, measuring the temperature of the tiled display screen after the temperature of the tiled display screen is stable. The difference between the measured temperature and the temperature before being lightened up is the temperature rise value.

At step S302, acquiring a temperature rise coefficient of the tiled display screen when the tiled display screen display in each of the target gray scales, wherein the temperature rise coefficient is a ratio of the temperature rise value to the maximum temperature rise value. The maximum temperature rise value is the maximum value of temperature rise coefficients of the tiled display screen corresponding to all target gray scales. Specifically, the maximum temperature rise value is the temperature rise value of the screen when the tiled display screen displays the maximum gray scale of a preset range of gray scale.

At step S303, determining a fitting relation between the gray scale and the temperature rise coefficient according to the temperature rise coefficients of the tiled display screen corresponding to the target gray scales. The fitting relation of the gray scale and the temperature rise coefficient may be expressed as:

$$Y = \alpha * \text{Gray}^{\beta}$$

Wherein Gray represents a gray scale in a range from 0 to 255; Y represents a temperature rise coefficient. Gray takes every target gray scale throughout the range from 0 to 255, respectively, so that α and β values may be determined in combination with the temperature rise coefficients of the tiled display screen corresponding to the target gray scales.

As shown in FIG. 7, the tiled display screen further includes a fifth pre-process module 45 and a sixth pre-process module 46. The fifth pre-process module 45 is configured to acquire a time interval of the visible residual image; and determine the number of images displayed in the time interval according to the frame rate of the tiled display screen.

The process of acquiring the time interval of the visible residual image may specifically include: lightening up the first region of the tiled display screen with the first gray scale and lightening up the second region of the tiled display screen with the second gray scale, and lightening up the first region and the second region with the second gray scale simultaneously every a target duration, so as to acquire a time interval immediately after which the visible residual image begins to appear.

Here, the first gray scale and the second gray scale are two gray scales with large contrast difference. For example, the first gray scale is 0, the second gray scale is 255. At timing to, the first region of the tiled display screen is lightened up with a gray scale of 0 and the second region of the tiled display screen is lightened up with a gray scale of 255, and the first region and the second region are lightened up with a gray scale of 255 simultaneously after a target duration, that is, the whole screen is switched to a white screen, the timing $t_2$ when the visible residual image capable of being saw by human eyes begins to appear is recorded, so that the time interval $\Delta t = t_2 - t_0$ immediately after which the visible residual image begins to appear may be acquired. The number $N = \Delta t \times F$ of the frame image data in the time interval may be determined according to the number, which is recorded as F, of the frame image data uploaded every second.

The sixth pre-process module 46 is configured to perform the following steps S401 to S405.

At step S401, acquiring multiple frames of test image data and a preset initial influence coefficient of each of the multiple frames of test image data, according to the number of the images displayed during the time interval. A sum of the initial influence coefficients is 1. The initial influence coefficient of a previous frame of test image data is larger than or equal to the initial influence coefficient of a next frame of test image data.

In an example, acquiring N frames of test image data based on the number of frames of image data during the time interval; setting the initial influence coefficients of the frames of test image data to be equal to each other, and the sum of the initial influence coefficients of the frames of test image data is 1. That is, the initial influence coefficient $$a_1 = a_2 = \ldots = a_n = \frac{1}{N}.$$

At step S402, acquiring a first increased temperature of the tiled display screen after the tiled display screen plays the multiple frames of test image data.

Specifically, the tiled display screen plays N frames of test image data, so that the amount (i.e. the first increased temperature $\Delta T_1$) by which the temperature of the tiled display screen increases is recorded.

At step S403, weighting the pixel information of each pixel in each frame of test image data by using each of the initial influence coefficients to acquire third gray-scale data.

The pixel information of the pixel in the test image data includes: the red channel value, the green channel value and the blue channel value of the pixel in the test image data, which may be directly acquired. At step S403, weighting the pixel information of each pixel in test image data according to above Formula (1), which is similar to determining the first gray-scale data and the specific operation process thereof will not be repeated herein again.

At step S404, lightening up the tiled display screen with the third gray-scale data for a lightening duration which is the same as a duration for playing the multiple frames of test image data, and acquiring a second increased temperature of the tiled display screen after the lightening duration elapses.

Lightening up the tiled display screen with the second gray-scale image data for a lightening duration which is the same as a duration (i.e., $\Delta t$) for playing the N frames of test image data, so as to display an image corresponding to the second gray-scale image data; and recording the amount (i.e. the second increased temperature $\Delta T_2$) by which the temperature of the tiled display screen increases.

At step S405, when a difference between the first increased temperature and the second increased temperature does not meet a preset condition, updating the initial influence coefficient until the difference between the first increased temperature and the second increased temperature meets a second preset condition, and taking the updated initial influence coefficient as the target influence coefficient.

The second preset condition is $|\Delta T_2 - \Delta T_1| \leq \varepsilon$, wherein $\varepsilon \leq 1.5°$ C.

Determining if $|\Delta T_2 - \Delta T_1|$ is less than $\varepsilon$ or not. If not, updating the initial influence coefficient. Specifically, the sixth pre-process module 46 is configured to update the initial influence coefficient by: for each initial influence coefficient, respectively adjusting the initial influence coefficient corresponding to the previous frame of test image data and the initial influence coefficient corresponding to the next frame of test image data, such that the initial influence coefficient of the previous frame of test image data after adjustment is larger than the initial influence coefficient of the previous frame of test image data before adjustment, and the initial influence coefficient of the next frame of test image data after adjustment is smaller than the initial influence coefficient of the next frame of test image data before adjustment.

As shown in FIG. 2, the display module 100 may further include a storage module 25 and an update module 26. The storage module 25 is configured to store data, for example, the gray-scale ratio (i.e. a weighting coefficient in Formula 1) between sub-pixels, the fitting relationship between the gray scale and the temperature rise coefficient, the target influence coefficient of the historical image data on data to be displayed, the heat influence coefficient between different display regions, and the gray-scale compensation table, all of which may be stored in the storage module 25.

The update module 26 is configured to store the regional image data into the storage module 25 to update the historical image data.

In addition, the weighting process sub-module 222 may write the heat accumulation data into the storage module 25, every time the heat accumulation data of a display region is determined. When the first determination sub-module 231 of the compensation data determination module 23 determines a gray-scale compensation coefficient of a target display region, the first determination sub-module 231 may read, from the storage module 25, the heat accumulation data for the display regions in the preset region centered on the display panel to which the target display region belongs.

Figure 8:
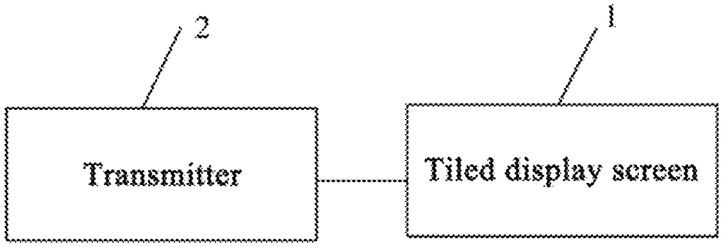
FIG. 8 is a schematic diagram showing a tiled display system in some embodiments of the present disclosure.

An embodiment of the present disclosure further provides a tiled display system. FIG. 8 is a schematic diagram showing the tiled display system in some embodiments of the present disclosure. As shown in FIG. 8, the tiled display system includes a transmitter and the tiled display screen in the above embodiment. The transmitter is configured to transmit corresponding regional image data to each display module according to the image data of the image to be displayed of the tiled display screen.

The image data of the image to be displayed may be acquired according to video stream information transmitted by a signal source.

Figure 9:
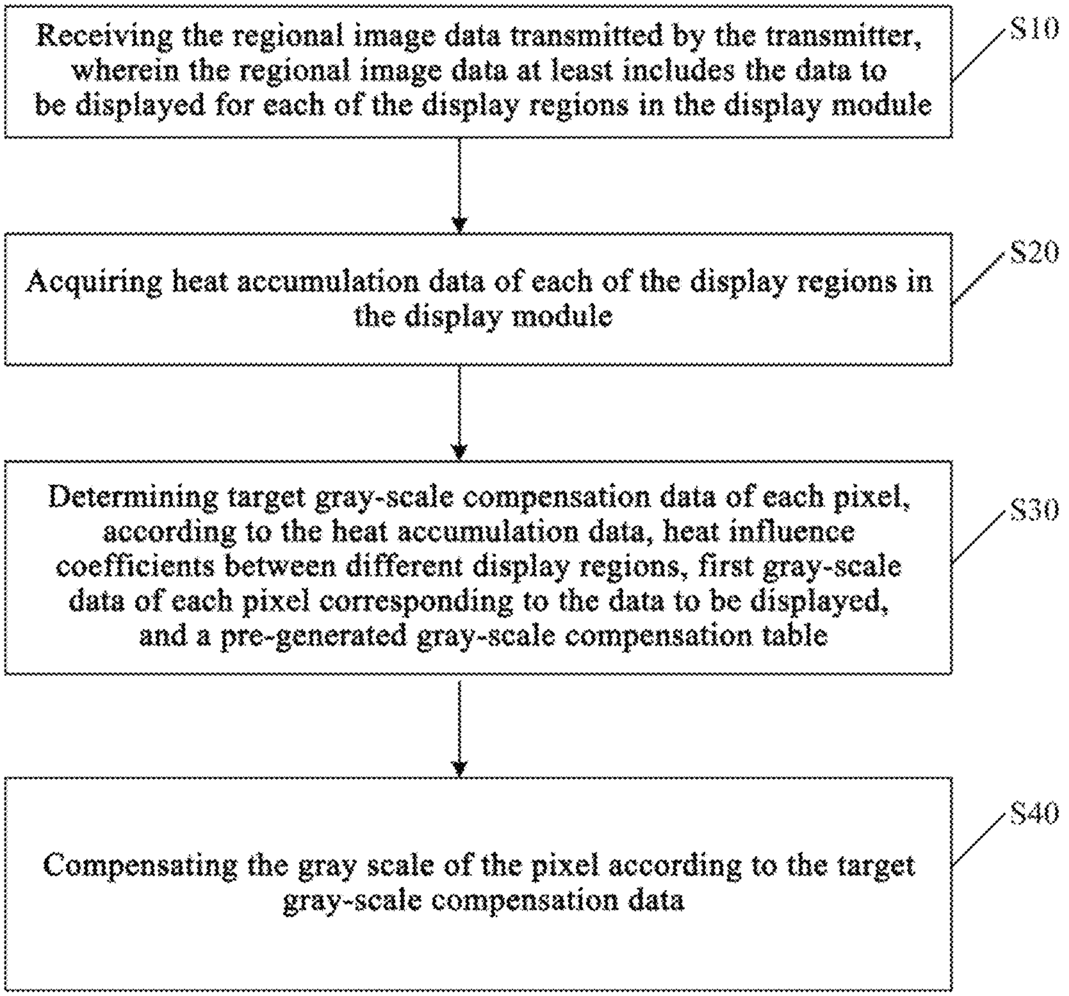
FIG. 9 is a schematic diagram showing a display method of a tiled display screen in some embodiments of the present disclosure.

An embodiment of the present disclosure further provides a display method of a tiled display screen. FIG. 9 is a schematic diagram showing the display method of the tiled display screen in some embodiments of the present disclosure. The tiled display screen includes a plurality of display modules, and the display method of the tiled display screen includes the following steps S10 to S40 performed by each of the display modules.

At step S10, receiving the regional image data transmitted by the transmitter, wherein the regional image data at least includes the data to be displayed for each of the display regions in the display module.

At step S20, acquiring heat accumulation data of each of the display regions in the display module.

At step S30, determining target gray-scale compensation data of each pixel, according to the heat accumulation data, heat influence coefficients between different display regions, first gray-scale data of each pixel corresponding to the data to be displayed, and a pre-generated gray-scale compensation table.

At step S40, compensating the gray scale of the pixel according to the target gray-scale compensation data.

Specifically, the display method of the tiled display screen will be described below, and the display method of the tiled display screen includes the following steps S10 to S40 executed by each of the display modules.

At step S10, the display module receives the regional image data transmitted by the transmitter, and the regional image data at least includes the data to be displayed for each of the display regions in the display module.

At step S20, acquiring heat accumulation data of each of the display regions in the display module. The step S20 may specifically include the following steps S21 and S22.

At step S21, for each of at least one frame of historical image data, determining the temperature rise coefficient of the display region corresponding to the historical image data, according to the second gray-scale data of each pixel corresponding to the historical image data, and the fitting relation between the gray scale and the temperature rise coefficient.

The specific process of step S21 may refer to the process of the coefficient determination sub-module described above, and is not described herein again.

At step S22, weighting the temperature rise coefficients corresponding to the display region according to the target influence coefficient of each of the at least one frame of historical image data on the data to be displayed, so as to acquire the heat accumulation data of the display region.

The specific process of step S21 may refer to the process of the weighting process sub-module, and is not described herein again.

At step S30, determining the target gray-scale compensation data of the pixel, according to the heat accumulation data, the heat influence coefficient between different display regions, the first gray-scale data of each pixel corresponding to the data to be displayed, and a pre-generated gray-scale compensation table. The step S30 specifically includes steps S31 to S33.

At step S31, for each of the display regions, the first determination sub-module is configured to: take the display region as a target display region; and determine a gray-scale compensation coefficient of the target display region, according to the heat influence coefficient and the heat accumulation data of the display regions in a preset region taking a display panel to which the target display region belongs as a center.

The specific process of step S31 may refer to the process of the first determination sub-module described above, and is not described herein again.

At step S32, determining the initial gray-scale compensation data of the pixel, according to the first gray-scale data of each pixel in the target display region corresponding to the data to be displayed and the gray-scale compensation table.

The specific process of step S32 may refer to the processing process of the second determination sub-module described above, and is not described herein again.

At step S33, determining the target gray-scale compensation data of the pixel, according to the gray-scale compensation coefficient and the initial gray-scale compensation data.

The specific process of step S33 may refer to the process of the second determination sub-module described above, and is not described herein again.

At step S40, compensating the gray scale of the corresponding pixel according to the target gray-scale compensation data.

When gray scale is compensated, the gray scale of the red sub-pixel of the pixel is compensated according to the following formula specifically:

$$P_R' = P_R - C_W$$

$P_R'$ is the compensated pixel information of the red sub-pixel of the pixel, $P_R$ is the original pixel information of the red sub-pixel. For the green and blue sub-pixels of the pixel, their pixel information remains unchanged.

An embodiment of the present disclosure further provide a computer non-transitory readable storage medium storing a computer non-transitory readable storage medium thereon, and when the computer program is executed by a processor, the computer program performs the steps of the display method for the tiled display screen in anyone of the foregoing method embodiments. The storage medium may be a volatile or non-volatile computer non-transitory readable storage medium.

Figure 10:
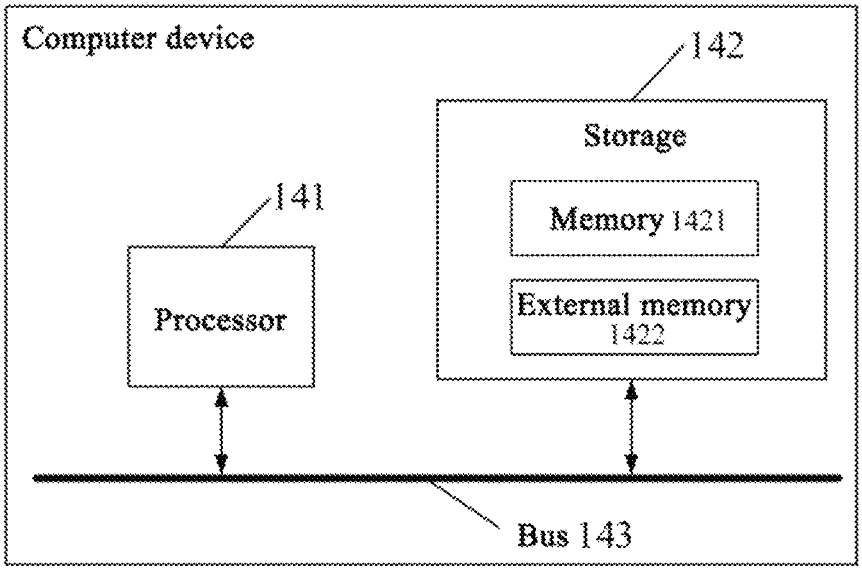
FIG. 10 is a schematic diagram showing a structure of a computer device in an embodiment of the present disclosure.

An embodiment of the present disclosure further provides a computer device, FIG. 10 is a schematic diagram showing a structure of the computer device in an embodiment of the present disclosure. As shown in FIG. 10, the computer device includes a processor 141, a memory 142, and a bus 143. The memory 142 stores machine-readable instructions executable by the processor 141, and the processor 141 is configured to execute the machine-readable instructions stored in the memory 142, when the machine-readable instructions are executed by the processor 141, the processor 141 executes the steps in the display method of the tiled display screen.

The storage 142 includes a memory 1421 and an external memory 1422. The memory 1421 is also called an internal memory, and is used for temporarily storing the operation data in the processor 131 and the data exchanged with the external storage 1422 such as a hard disk. The processor 141 exchanges data with the external storage 1422 through the internal memory 1421. When the computer device is running, the processor 141 and the storage 142 communicate with each other through the bus 143, so that the processor 141 executes the execution instructions mentioned in the above method embodiments.

It will be understood by those of ordinary skill in the art that all or some of the steps of the methods, systems, functional modules/units in the devices disclosed above may be implemented as software, firmware, hardware, or suitable combinations thereof. In a hardware implementation, the division between functional modules/units mentioned in the above description does not necessarily correspond to the division of physical components. For example, one physical component may have multiple functions, or one function or step may be performed by several physical components in cooperation. Some or all of the physical components may be implemented as software executed by a processor, such as a central processing unit, digital signal processor, or microprocessor, or be implemented as hardware, or be implemented as an integrated circuit, such as an application specific integrated circuit. Such software may be distributed on computer readable media, which may include computer storage media (or non-transitory media) and communication media (or transitory media). The term computer storage media includes volatile and nonvolatile, removable and non-removable media implemented in any method or technology for storage of information such as computer readable instructions, data structures, program modules or other data, as is well known to those skilled in the art. Computer storage media includes but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used to store the desired information and which can accessed by a computer. In addition, communication media typically embodies computer readable instructions, data structures, program modules or other data in a modulated data signal such as a carrier wave or other transport mechanism and includes any information delivery media as is well known to those skilled in the art.

It should be noted that, in this document, the terms "include" "comprise" or any other variation thereof, are intended to cover a non-exclusive inclusion, such that a process, method, article, or apparatus that comprises a list of elements does not include only those elements but may include other elements not expressly listed or inherent to such process, method, article, or apparatus. Without further limitation, an element identified by the phrase "comprising an . . . " does not exclude the presence of other identical elements in the process, method, article, or apparatus that comprises the element.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and essence of the present disclosure, and these changes and modifications are to be considered within the scope of the present disclosure.

What is claimed is:

1. A tiled display screen, comprising: a plurality of display modules, each of the plurality of display modules comprising: a receiver, a processor, and at least one display panel, each of the display panel comprising at least one display region, each of the display region comprising a plurality of pixels; wherein the receiver is configured to receive regional image data, wherein the regional image data at least comprises data to be displayed in each of the display regions in the display module;

the processor is configured to: acquire heat accumulation data for each of the display regions in the display module; determine target gray-scale compensation data for each pixel according to the heat accumulation data, a heat influence coefficient between different display regions, first gray-scale data for the pixel corresponding to the data to be displayed, and a pre-generated gray-scale compensation table; and compensate a gray scale of the pixel according to the target gray-scale compensation data;

wherein the heat accumulation data represents an accumulated heat influence on the display region of at least one frame of historical image data for the display region-, wherein the processor comprises:

a heat acquisition module configured to acquire the heat accumulation data for each of the display regions in the display module;

a compensation data determination module configured to determine the target gray-scale compensation data for each pixel according to the heat accumulation data, the heat influence coefficient between the different display regions, the first gray-scale data for the pixel corresponding to the data to be displayed, and the pre-generated gray-scale compensation table; and a compensation module configured to compensate the gray scale of the pixel according to the target gray-scale compensation data, wherein for each of the display regions, the heat acquisition module is specifically configured to determine the heat accumulation data for the display region, according to the at least one frame of historical image data for the display region, a target influence coefficient of each of the at least one frame of historical image data on the data to be displayed, and a pre-determined fitting relation between a gray scale and a temperature rise coefficient.

2. The tiled display screen of claim 1, wherein the heat acquisition module comprises:

a coefficient determination sub-module configured to: for each of the at least one frame of historical image data, determine a temperature rise coefficient of the display region corresponding to the historical image data, according to second gray-scale data for each pixel corresponding to the historical image data and the fitting relation between the gray scale and the temperature rise coefficient; and a weighting process sub-module configured to weighting the temperature rise coefficients of the display region, according to the target influence coefficient of each of the at least one frame of historical image data on the data to be displayed, so as to acquire the heat accumulation data for the display region.

3. The tiled display screen of claim 2, wherein the coefficient determination sub-module comprises:

a first determination unit configured to average the second gray-scale data for all pixels in the display region corresponding to the historical image data to acquire averaged gray-scale data for the display region; and a second determination unit configured to determine the temperature rise coefficient of the display region corresponding to the historical image data according to the average gray-scale data and the fitting relation.

4. The tiled display screen of claim 2, wherein the coefficient determination sub-module further comprises: a third determination unit configured to: acquire a gray-scale ratio of sub-pixels in each pixel; and determine the second gray-scale data of the pixel according to the gray-scale ratio and pixel information of the sub-pixels of the pixel corresponding to the historical image data.

5. The tiled display screen of claim 1, wherein the processor further comprises:

a first gray scale determination module configured to acquire a gray-scale ratio of sub-pixels of each pixel corresponding to the data to be displayed; and determine the first gray-scale data for the pixel according to the gray-scale ratio and the pixel information of the sub-pixels of the pixel corresponding to the data to be displayed.

6. The tiled display screen of claim 5, further comprising:

a first pre-process module configured to respectively lighten up the tiled display screen according to colors of the sub-pixels to acquire temperature variation values of the tiled display screen corresponding to the colors; and take a ratio of the temperature variation values of the tiled display screen corresponding to the colors of the sub-pixels as the gray-scale ratio of the sub-pixels.

7. The tiled display screen of claim 1, wherein the compensation data determination module comprises: a first determination sub-module, a second determination sub-module, and a third determination sub-module;

the first determination sub-module is configured to take anyone of the display regions as a target display region; and determine a gray-scale compensation coefficient of the target display region, according to the heat influence coefficients and the heat accumulation data for the display regions in a preset region centered on the display panel to which the target display region belongs;

the second determination sub-module is configured to determine initial gray-scale compensation data of each pixel, according to the first gray-scale data for each pixel corresponding to the data to be displayed in the target display region and the gray-scale compensation table; and the third determination sub-module is configured to determine the target gray-scale compensation data for each pixel, according to the gray-scale compensation coefficient and the initial gray-scale compensation data.

8. The tiled display screen of claim 7, wherein the first determination sub-module is specifically configured to: weighting the heat accumulation data for the display regions in the preset region, according to the heat influence coefficients of the display regions in the preset region, so as to acquire the gray-scale compensation coefficient of the target display region.

9. The tiled display screen of claim 7, wherein the regional image data further comprises data to be displayed for at least a part of the display regions in an adjacent display module; and the data to be displayed in each display region in the preset region centered on anyone of the display panels of the display module is comprised in the regional image data.

10. The tiled display screen of claim 1, wherein the display module further comprises a second pre-process module configured to control the tiled display screen to display each of the target gray scales in a preset range of gray scale, and controlling the tiled display screen to display each of the target gray scales comprises: controlling a first region of the tiled display screen to display an image with a maximum gray scale and controlling a second region of the tiled display screen to display an image with a minimum gray scale; after a temperature of the tiled display screen is stable, controlling the first region to display with the target gray scale and controlling the second region to display with correction gray scale, such that a brightness of the first region is the same as a brightness of the second region;

wherein a difference value between the target gray scale and the correction gray scale is served as initial gray-scale compensation data; the gray-scale compensation table comprises each of the target gray scales in the preset range of gray scale and the initial gray-scale compensation data corresponding to the target gray scale.

11. The tiled display screen of claim 7, further comprising a third pre-process module configured to:

select one of the display panels in the tiled display screen as a reference display panel; acquire an initial temperature of the reference display panel before the reference display panel is lightened up; lighten up the reference display panel with a test gray scale to acquire a current temperature of each of Q×Q display regions centered on the reference display panel;

take a difference value between the current temperature and the initial temperature of the display region as a temperature variation value of the display region; and normalize a ratio of the temperature variation value for each of the Q×Q display regions and a maximum temperature variation value to acquire a filtering parameter matrix, with the filtering parameter matrix comprising the heat influence coefficients of all display regions in the preset region.

12. The tiled display screen of claim 1, wherein the display module further comprises a fourth pre-process module configured to:

control the tiled display screen to display each of the target gray scales in a preset range of gray scale to acquire the temperature rise value of the tiled display screen corresponding to each of the target gray scales;

acquire the temperature rise coefficient of the tiled display screen corresponding to each of the target gray scales, wherein the temperature rise coefficient is a ratio of the temperature rise value to a maximum temperature rise value; and determine the fitting relation between the gray scale and the temperature rise coefficient, according to the temperature rise coefficient of the tiled display screen corresponding to each of the target gray scales.

13. The tiled display screen of claim 1, further comprising a fifth pre-process module and a sixth pre-process module;

wherein the fifth pre-process module is configured to acquire a time interval immediately after which the visible residual image begins to appear; and determine a number of images displayed during the time interval according to a frame rate of the tiled display screen; and the sixth pre-process module is configured to:

acquire multiple frames of test image data and a preset initial influence coefficient of each of the multiple frames of test image data, according to the number of the images displayed during the time interval; wherein a sum of the initial influence coefficients is 1; the initial influence coefficient of a previous frame of test image data is greater than or equal to the initial influence coefficient of a next frame of test image data;

acquire a first increased temperature of the tiled display screen after the tiled display screen plays the multiple frames of test image data;

weight the pixel information of each pixel corresponding to each frame of test image data according to each of the initial influence coefficients to acquire third gray-scale data;

lighten the tiled display screen with the third gray-scale data for a lightening duration which is the same as a duration for playing the multiple frames of test image data, and acquire a second increased temperature of the tiled display screen after the lightening duration elapses; and in response to that a difference between the first increased temperature and the second increased temperature does not meet a preset condition, update the initial influence coefficient until the difference between the first increased temperature and the second increased temperature meets a second preset condition; and take the updated initial influence coefficient as the target influence coefficient.

14. The tiled display screen of claim 13, wherein the fifth pre-process module is specifically configured to:

lighten a first region of the tiled display screen with a first gray scale and lighten a second region of the tiled display screen with a second gray scale; and lighten the first region and the second region with the second gray scale simultaneously every a target duration, so as to acquire the time interval immediately after which the visible residual image begins to appear.

15. The tiled display screen of claim 13, wherein the sixth pre-process module is specifically configured to update the target influence coefficient by:

for each of the initial influence coefficients, respectively adjusting the initial influence coefficients corresponding to the previous frame of test image data and the next frame of test image data, such that the initial influence coefficient of the adjusted previous frame of test image data is larger than the initial influence coefficient of the previous frame of test image data before adjustment, and the initial influence coefficient of the adjusted next frame of test image data is smaller than the initial influence coefficient of the next frame of test image data before adjustment.

16. A tiled display system, comprising:

the tiled display screen of claim 1; and a transmitter configured to transmit the regional image data to each of the display modules according to the image data of the image to be displayed.

17. A display method of a tiled display screen comprising a plurality of display modules, wherein the display method comprises:

receiving, by each of the plurality of display modules, regional image data, wherein the regional image data at least comprises data to be displayed in each of display regions in the display module;

acquiring, by the display module, heat accumulation data of each of the display regions; determining target gray-scale compensation data of each pixel according to the heat accumulation data, a heat influence coefficient between different display regions, first gray-scale data of the pixel corresponding to the data to be displayed, and a pre-generated gray-scale compensation table; and compensating a gray scale of the pixel according to the target gray-scale compensation data;

wherein the heat accumulation data represents an accumulated heat influence on the display region of at least one frame of historical image data of the display region-, wherein acquiring, by the display module, the heat accumulation data for each of the display regions in the display module, comprises: determining the heat accumulation data for the display region, according to the at least one frame of historical image data for the display region, a target influence coefficient of each of the at least one frame of historical image data on the data to be displayed, and a pre-determined fitting relation between a gray scale and a temperature rise coefficient.

18. A computer-non-transitory readable storage medium with a computer program stored thereon which is configured to, when being run by the processor, cause the processor to perform the display method of claim 17.

* * * * *